Figures 1, 2:
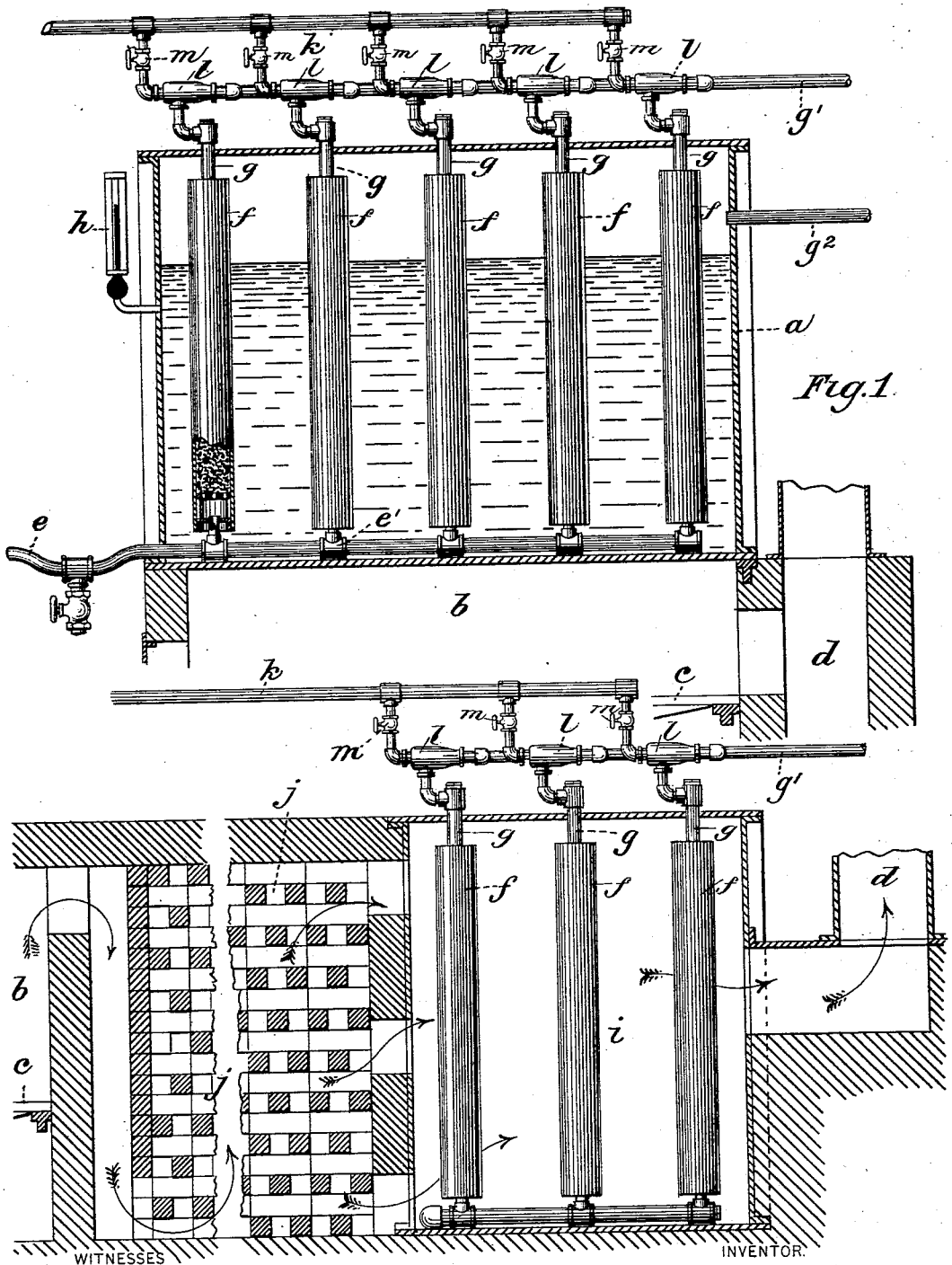

(No Model.)

H. FRASCH.
ART OF PURIFYING PETROLEUM.

No. 564,921.  Patented July 28, 1896.

WITNESSES
C. M. Clarke
W. B. Corwin

INVENTOR.
Herman Frasch
by W. Bakewell & Sons
his Attorneys

UNITED STATES PATENT OFFICE.

HERMAN FRASCH, OF CLEVELAND, OHIO, ASSIGNOR TO THE SOLAR REFINING COMPANY, OF OHIO.

ART OF PURIFYING PETROLEUM.

SPECIFICATION forming part of Letters Patent No. 564,921, dated July 28, 1896.

Application filed October 30, 1888. Serial No. 289,525. (No specimens.)

*To all whom it may concern:*

Be it known that I, HERMAN FRASCH, of Cleveland, in the county of Cuyahoga and State of Ohio, have invented a new and useful Improvement in the Art of Purifying Petroleum; and I do hereby declare the following to be a full, clear, and exact description thereof.

My invention relates to the purification and deodorization of vapors of petroleum of the Canadian or Lima class, which are distinguished by their large proportion of sulfur compounds, which resist the ordinary treatment for the removal of sulfur and give to the oil a very disgusting odor. Such oils may be purified by passing their vapors through a column charged with a metallic purifying agent, such, for example, as metallic iron or copper, in the form of borings or other finely-divided particles. In passing through the metallic purifying agent the sulfur compounds of the vapors unite chemically with the metal, and are deposited on the surface thereof in the form of sulfids of the metal, the vapors being thus purified and deodorized. In practice I have found that the purifying action of a single column, even if of large size, is individually small, and that to practice such process on a commercial scale it is desirable to employ a large number of small columns, each, say, eight feet high by six inches in diameter, these columns being independently connected with the vapor-outlet or vapor-space of the still, and that in order to produce good results the columns should be uniformly heated to a temperature of about 520° Fahrenheit, more or less, which is nearly the temperature at which the vapors are decomposed and their color injured. If the columns are not all maintained at approximately the same temperature, the best results cannot be produced—that is, if in any of the columns the decomposing heat is exceeded the oil will be discolored, or if some of the columns fall below the required temperature they will fail to desulfurize properly the passing oil-vapors, and the product of the columns will therefore lack uniformity of purification. It is also important to maintain uniformity in the temperature even of individual columns, for when heating a column with the direct heat of a fire I have found in practice that whereas at one time vapors which left the column at a mean temperature of 600° Fahrenheit produced a white distillate, at other times vapors leaving the column at a mean temperature of 570° Fahrenheit were scorched, so as to produce a bad distillate, indicating that in the latter instance portions of the column were highly heated and thus scorched the oil, although the mean temperature of the issuing vapors was lower than that of vapors producing good distillate on other occasions. In practicing the process on a large scale with a battery of one hundred or more columns a good and uniformly-purified product may be obtained by keeping all the columns at a proper and uniform temperature. I have also found that it is very desirable to secure a uniform passage of the vapors through the several purifying-columns, so as not to overtax any particular column, which would involve the danger of vapors passing without effective purification, and so as to expose the vapors in the different columns for a uniform time to the hot purifying materials, and this uniformity of passage I secure by producing a partial vacuum on the outlet side of the purifiers or purifying-columns or by analogous means, the vacuum, if necessary, being regulated for the columns individually to correct the differences of resistance in the various columns.

In the accompanying drawings I have illustrated two forms of apparatus by which my invention may be practiced.

Figure 1 is a vertical longitudinal section of one form of the apparatus. Fig. 2 is a similar section of the other form thereof.

Like symbols of reference indicate like parts in each.

In Fig. 1, $a$ represents a chamber or vessel for containing the purifying-columns, and $b$ represents a fire-chamber, having grate-bars $c$ and waste-flue $d$. $e$ is the vapor-pipe leading from the oil-still into the vessel $a$, and $f$ are the columns containing the purifying material. These columns are connected at the base with the vapor-pipe $e$ by any suitable unions $e'$, and at the top each column is connected by a short pipe or neck $g$ with an exhauster of suitable construction, such as a steam-ejector $l$, the nozzle of which leads into a vapor-pipe $g'$, extending to the condenser or condensers. The ejectors $l$ are supplied with steam from a steam-pipe $k$, and each ejector is provided with a valve $m$, by which the quantity of steam supplied to each may be regulated.

The vessel $a$ is adapted to be filled or partially filled with a liquid adapted to withstand the temperature employed, such as molten metal of low fusing temperature, or a heavy oil, which liquid surrounds the columns and that part of the vapor-pipe $e$ which is within the vessel.

$g^2$ is a pipe by which the vessel is charged with the liquid. When heavy oil is used in the tank as the medium for transmitting heat to the columns, this pipe should lead to a condenser for the purpose of liquefying any part of the oil which may be vaporized by the heat of the furnace.

$h$ is a thermometer, which is connected with the interior of the vessel $a$ below the liquid-level for indicating the heat thereof. The liquid in the vessel $a$ derives heat from the furnace $b$ and communicates it to the columns $f$, preventing them from excessive or sudden heating and so regulating the heat that with a little attention all the columns in the vessel may be maintained at a uniform and constant temperature.

The vapors from the still pass through the pipe $e$ and connections $e'$ into the bases of the columns $f$, and as they ascend through the columns their sulfur compounds are combined with the metallic purifying agent, as above indicated, and the deodorized and purified vapors pass through the pipes $g$, steam-ejectors $l$, and thence to the pipe $g'$, which leads to the condenser. A blast of steam is maintained in the ejectors $l$ from the pipe $k$ and creates a partial vacuum on the side of the columns next to the condenser, which tends to draw the vapors through the purifying-columns, and by regulating the quantity of steam discharged into the ejectors the velocity of the passage of the vapors through the columns may be governed. This regulation may be effected by controlling the supply of steam of each ejector separately, so as to make the suction on the column conform to the resistance afforded by the contained purifying material, but even without such individual regulation a substantial uniformity and equality in the quantity of vapors passed through each may be maintained by supplying all the ejectors from a common steam-pipe having equal access to each, because if the resistance of a particular column be such as tends unduly to check the flow through it the jet produces a higher degree of vacuum, and thus the passage of the vapors then depends much less on the resistance of the contents of the columns than when no means for exhausting the vapors are employed.

Instead of using individual exhausters for each column, one exhauster may be employed for several, and the exhausters may be modified in construction and arrangement.

In Fig. 2, $i$ is the chamber, within which are the columns $f$, and $j$ is a chamber filled with checker-work, such as is used in a regenerator-furnace, which communicates both with the chamber $i$ and with the fire-chamber $b$, by means of the connecting-flues which are shown in the drawings. The products of combustion pass from the fire-chamber through the chambers $j$ and $i$ in succession into the stack-flue $d$, heating the columns $f$ and the checker-work in the chamber $j$. The checker-work, when it is thus heated, serves as a regulator of the temperature of the products of combustion passing into the chamber $i$, for if the heat of the furnace should decrease, owing to fresh charging with coal or other reason, the heated checker-work would give up a portion of its heat to the cooler passing gases, and if the heat of the fire should unduly rise the excessive heat would be absorbed by the checker-work before the gases reach the column-chamber $i$, so that within this chamber the temperature of the heating-gases may be at all times preserved at a substantially constant degree, and thus the possibility of sudden and dangerous fluctuations of the temperature of the columns be avoided.

In the arrangement of Fig. 1 the liquid in the vessel also operates as a regulator between the charges of purifying material and the fire to equalize the temperature through the absorption and giving out of heat, for if the gases should become overhot the absorption of this heat by the larger mass of liquid would prevent a rise of temperature in the purifying charges which would be detrimental to the oil-vapors, and, on the other hand, if the heating-gases become overcool the liquid in the vessel $a$ gives up heat previously absorbed and prevents an injurious lowering of the temperature of the purifying charges. Each form of regulator, moreover, by its equalizing action counteracts the liability of one purifying charge becoming hotter than another.

I do not limit the scope of my invention to its use in connection with the apparatus which I have shown and described, since it may be modified in various ways, and other forms of apparatus adapted to produce the same result will suggest themselves to those skilled in the art.

I claim—

1. In the purification of petroleum of the class described, the improvement consisting in heating through hot gases of combustion a number of independent charges of small diameter of a purifying agent to an elevated desulfurizing temperature which is the same for the different charges, equalizing such temperature through the absorption and giving off of heat by a regulator between the charges of purifying material and the fire, dividing the vapors given off together from the same body of petroleum in distillation into a number of streams, subjecting these several streams separately each to the action of the purifying agent in one of said charges, and making such action alike on the different streams by forming a partial vacuum between the purifying agent and the condenser and thereby counteracting differences in the resistance of the several charges, substantially as set forth.

2. In the purification of petroleum of the class described, the improvement consisting in heating a number of charges of small diameter of a purifying agent to an elevated desulfurizing temperature, dividing the vapors given off together from the same body of petroleum in distillation into a number of streams, subjecting these several streams separately each to the action of the purifying agent in one of said charges, and making such action alike on the different streams by forming a partial vacuum between the purifying agent and the condenser and thereby counteracting differences in the resistance of the several charges, substantially as set forth.

3. In the purification of petroleum of the class described, the improvement consisting in heating a number of charges of small diameter of a purifying agent to an elevated desulfurizing temperature which is equalized for the different charges, dividing the vapors given off together into a number of streams, subjecting these streams separately each to the action of the purifying agent in one of said charges, and regulating the volume of said several streams to equalize the reaction in said charges; substantially as described.

In testimony whereof I have hereunto set my hand this 11th day of October, A. D. 1888.

HERMAN FRASCH.

Witnesses:
W. B. CORWIN,
J. K. SMITH.